(12) United States Patent
Besson et al.

(10) Patent No.: US 9,392,125 B1
(45) Date of Patent: Jul. 12, 2016

(54) DYNAMIC CALL BILLING AND INVOICE GENERATING APPLICATION

(71) Applicant: West Corporation, Omaha, NE (US)

(72) Inventors: Jean-Frederic Besson, Saint-Bres (FR); Mark B. Edwards, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 5 days.

(21) Appl. No.: 14/073,041

(22) Filed: Nov. 6, 2013

(51) Int. Cl.
*H04M 15/00* (2006.01)
*H04W 4/06* (2009.01)

(52) U.S. Cl.
CPC .......... *H04M 15/44* (2013.01); *H04M 15/8072* (2013.01); *H04M 15/8228* (2013.01); *H04W 4/06* (2013.01)

(58) Field of Classification Search
None
See application file for complete search history.

(56) References Cited

U.S. PATENT DOCUMENTS

| 6,925,065 | B1 * | 8/2005 | Roy | 370/260 |
|---|---|---|---|---|
| 7,313,538 | B2 * | 12/2007 | Wilmes | G06Q 20/207 705/19 |
| 7,602,893 | B2 * | 10/2009 | Bhatia et al. | 379/202.01 |
| 7,804,948 | B2 * | 9/2010 | Turner | 379/204.01 |
| 2004/0077334 | A1 * | 4/2004 | Joyce et al. | 455/406 |
| 2010/0076836 | A1 * | 3/2010 | Giordano et al. | 705/14.38 |
| 2012/0004998 | A1 * | 1/2012 | Ramer et al. | 705/14.46 |

* cited by examiner

*Primary Examiner* — Ashish K Thomas
(74) *Attorney, Agent, or Firm* — Raffi Gostanian

(57) ABSTRACT

Call related invoices may be generated and applied to calls and related services especially in certain countries with dynamic tax models and specific entity authorization rules and other strict requirements for generating such invoices. One example method of operation may include identifying a call session being initiated by at least one call party device and retrieving account information of the at least one call party. Next, a preliminary invoice is generated based on the initiated call session including the account information, and the invoice is then updated to include details of the call session once the call session has ended.

17 Claims, 7 Drawing Sheets

300

| | | % Value | Amount BDO | |
|---|---|---|---|---|
| 1 | | | | |
| 2 | Invoice Amount | | 5030.08 | |
| 3 | Rebate Discount | | | |
| 4 | | | | |
| 5 | Total Invoice before Taxes | | 5030.08 | |
| 6 | | | | All lines must appear on the invoice |
| 7 | Taxes Area | | | |
| 8 | PIS | 1.65% | 99.6953 | both the amount and percentage, but is informational |
| 9 | COFINS | 7.60% | 459.2025 | both the amount and percentage, but is informational |
| 10 | ISS | 5.00% | 302.1059 | both the amount and percentage and must be paid to MTC |
| 11 | CSLL | 1.00% | 60.4214 | both the amount and percentage, but is informational |
| 12 | IR | 1.50% | 90.6321 | both the amount and percentage, but is informational |
| 13 | Total Taxes | 16.75% | 1012.6581 | |
| 14 | | | | |
| 15 | Total Invoice After Taxes | | 6042.1381 | |
| 16 | | | | |
| 17 | Customer Pays / Boleto | | 5332.1869 | |
| 18 | Customer is responsible for paying PIS, COFINS, CSLL and IR | | | |
| 19 | BDO will remit the ISS to the prefeitura | | | |

FIG. 3B

DYNAMIC CALL BILLING AND INVOICE GENERATING APPLICATION

TECHNICAL FIELD OF THE APPLICATION

This application relates to a method and apparatus of identifying user accounts and matching applicable tax rates and billing information to an invoice and automatically generating and forwarding the invoices to the user accounts/customers based on previous calls performed.

BACKGROUND OF THE APPLICATION

Conventionally, large numbers of invoices are required to be generated for customers subscribing to various services and residing in certain geographical territories having required municipal government taxes. Those fees, taxes and other price points are dynamic variables which change over time or over varying locations. Such tax variables are especially difficult to track in countries, such as Brazil and Mexico since the tax rates must be present on the invoices generated by the large phone carrier companies. Also, the tax rates change so often that a phone billing application is required to provide dynamic billing and invoicing for the various customers using those services.

SUMMARY OF THE APPLICATION

One example embodiment of the present application may provide a method that includes identifying a call session being initiated by at least one call party device, retrieving account information of the at least one call party, generating a preliminary invoice based on the initiated call session including the account information, and updating the invoice to include details of the call session once the call session has ended.

Another example embodiment of the present application may include an apparatus that includes a receiver configured to receive a call session message indicating a call session being initiated, and a processor configured to identify the call session being initiated by at least one call party device, retrieve account information of the at least one call party, generate a preliminary invoice based on the initiated call session including the account information, and update the invoice to include details of the call session once the call session has ended.

BRIEF DESCRIPTION OF THE DRAWINGS

FIG. 3B illustrates an example screenshot of a call summary and tax rate user interface according to example embodiments of the present application.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
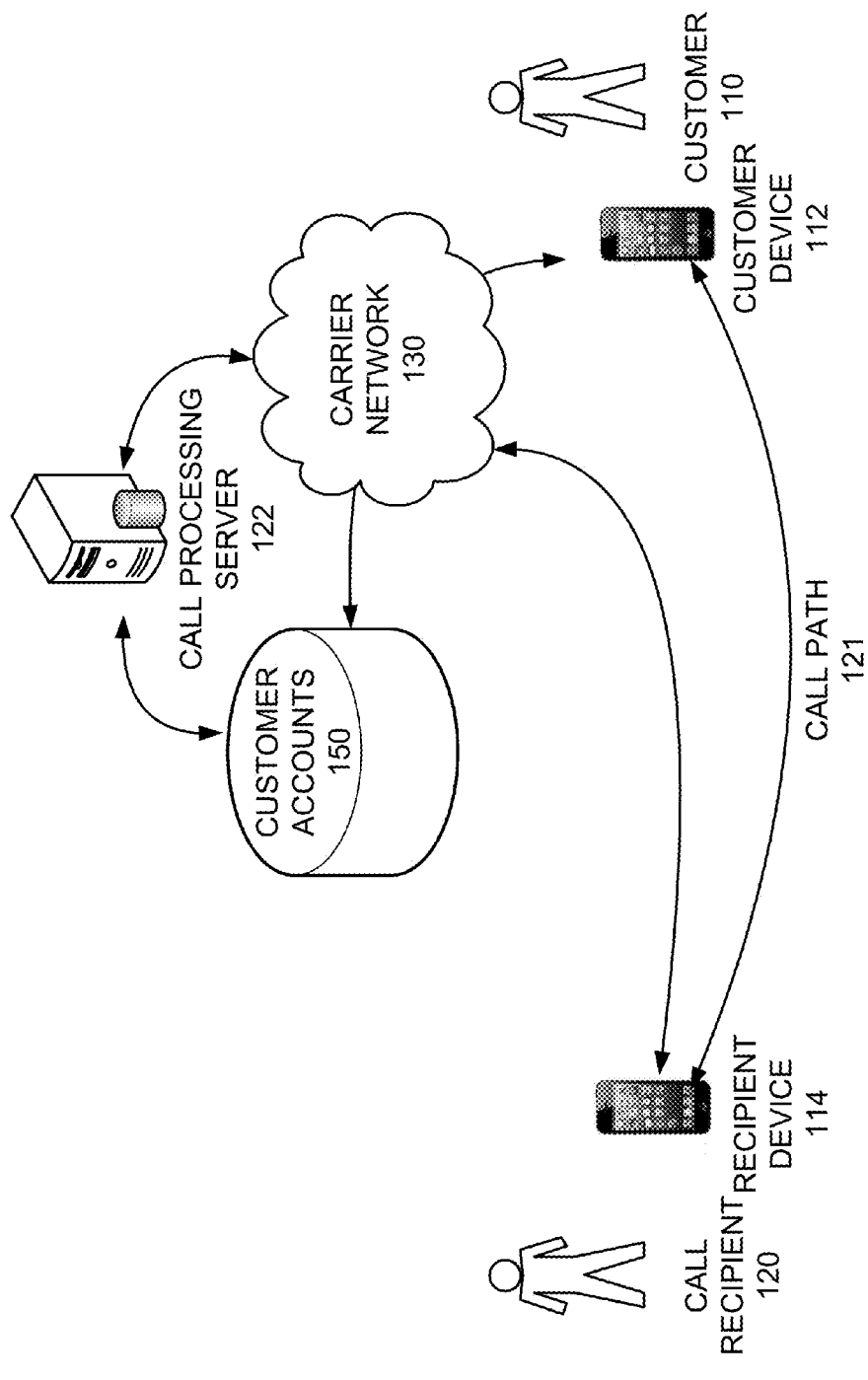
FIG. 1 illustrates a network system configuration according to example embodiments of the present application.

FIG. 1 illustrates an example communication network and call routing and communication application system according to example embodiments. Referring to FIG. 1, the network 100 includes a customer 110 operating a mobile device 112 and accessing a carrier network to either join a conference call or call another party, such as the call recipient 120 by placing a call from the customer device 112 to the recipient device 114. The devices operated by the users may be cell phones, landline phones, computer phones, smartphones, etc. The carrier network 130 may be voice network, a data network that supports voice and/or a different type of network that receives call requests, responses, dialed numbers, conference call bridge requests, etc. and forwards this information to a call processing server 122. The customer accounts 150 may be stored in a database and retrieved to process a call from the call processing server 122. A user profile, billing record or other information may be referenced when a call is placed and used to establish a call path 121 between the various call parties.

In order to create an invoice for a particular customer, a correct dollar amount must be determined and the invoice may also require that the taxes be included, a registration with local government is required and a bank slip may also be obtained. Once an invoice is created for a customer, then that customer is sent an email or other information message notifying them that their monthly invoice is available for download. The email may include a uniform resource locator (URL) that directs the user interface to a user application where a user may log-in and download the invoice. The invoice is a legal document and may be tracked when the customer accesses and downloads the invoice. That way, if there is a dispute or a late payment, that information may be used during the customer support process.

According to one example embodiment, an audio conference call may be performed and may be the basis of a subsequently generated invoice. In operation, when the call is performed with a specific call-in number and/or passcode, the call connects the user of the mobile device, telephone, etc., with a conferencing bridge. In a simple example, the leader calls-in first and "opens" the call. Next, for example purposes, two other participants may join the call. When the call completes and each participant disconnects, the tracked call usage is identified and processed through a mediation and/or billing procedure. It is during the mediation and/or billing processes that the customer account of the call leader is identified. The minutes for the leader and participants are all charged per minute at the customer's current rate. Then, during the monthly billing cycle, this information is passed to a call processing entity, such as 'EDICOM' which then performs the invoice generation procedures identified in this application.

There may be various fees that are created based on any and all functions arising out of the invoice creation and follow-up procedures. For example, there may be a fee to receive an email summary of each call after the call is completed. This summary provides information about each participant including the leader, the number they used to join (i.e., ANI) and when they joined and dropped from the call. This is one example of a fee, but there may be other fees created depending on the configuration that the leader has selected for his/her calls. For instance, one example of a total charge may be= ((rate*total minutes)+fees)), for the conference call.

The total cost may be received and applied to certain tax rates at a percentage for each of the tax types required for providing services in the specific country (e.g., Brazil, Mexico, etc.). For Brazil, the taxes are known as 'PIS' for a social integration program, 'COFINS' for a social contribution for welfare and other related programs and 'ISS' as a services tax, 'CSLL' for a social contribution on profits, and 'IR' as an income tax, and each of the taxes have a different tax rate. These tax rates may change month-to-month, and the application administrator is responsible for changing the percentages for each tax type.

The charges and the taxes are then placed on a 'NFSe' which is sent to the local municipal government (i.e., 'Prefeitura' in Sao Paulo). Once the invoice data is returned from the 'Prefeitura' and registered as approved, a message is then created and transmitted to a corresponding bank to obtain a banking slip which provides a unique payment identifier to the customer. Then, the final invoice(s) is created which contains a summary of charges, the 'NFSe' from the Prefeitura, the banking slip, and the detail associated with all the conferences completed for the month. The customer then receives an email with a link to a secure site where they obtain the actual invoice. Invoice updating may be performed once a month to simplify the invoice process, although, the data in the invoices may be updated according to every account, call, etc.

Figure 2:
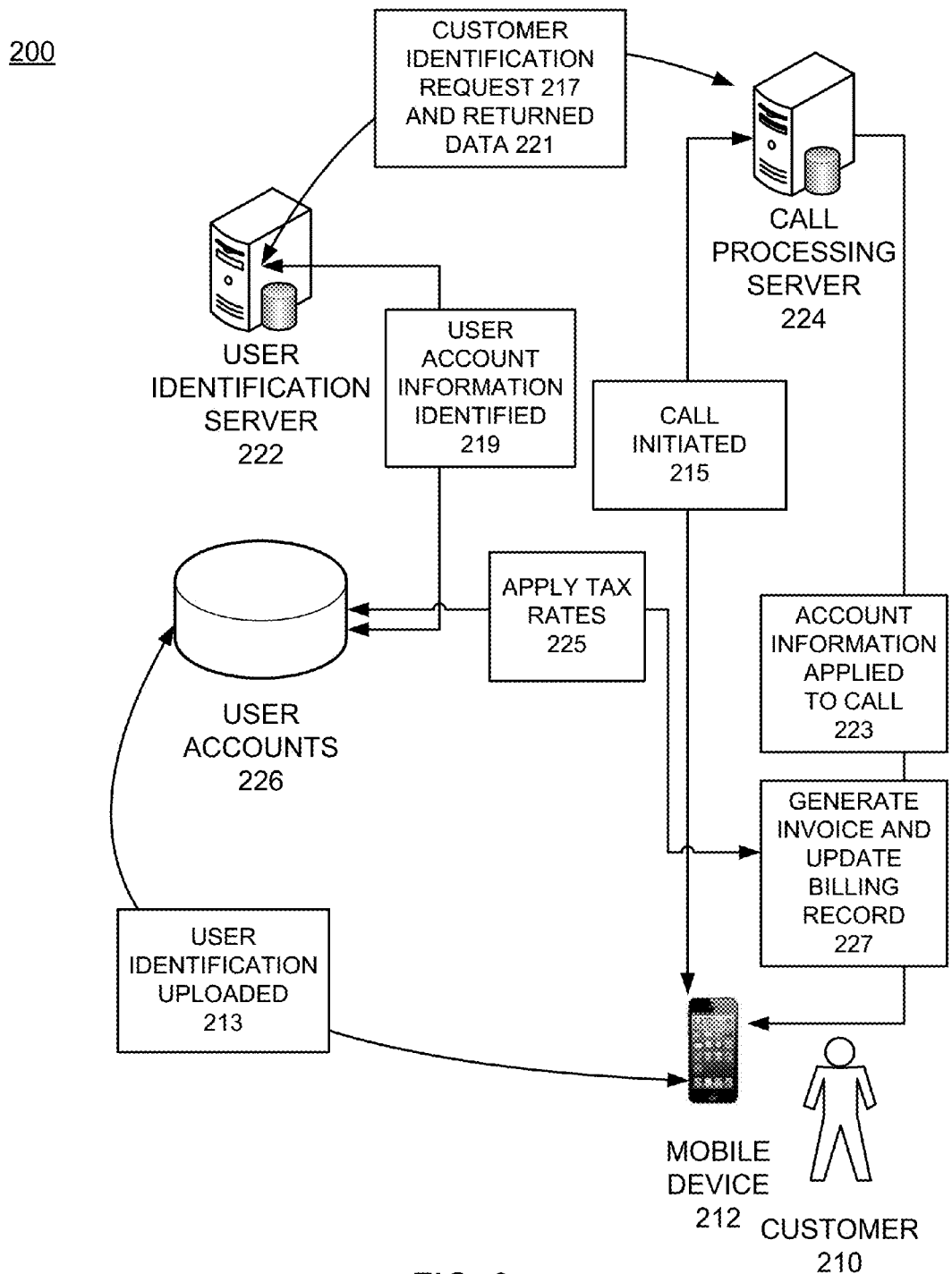
FIG. 2 illustrates a detailed logic flow diagram according to example embodiments of the present application.

FIG. 2 illustrates a detailed flow diagram according to example embodiments of the present application. Referring to FIG. 2, the logic diagram 200 includes a customer 210 initiating a call or joining a conference call via his or her mobile device 212. The call may trigger a user identification operation and corresponding upload operation 213 that links a user profile stored in the user accounts database 226 to the mobile device 212. The user account information is identified 219 and the information is transmitted to the user identifications server 222 for authorization and authentication. The customer identification 217 may be requested by the call processing server 224, and a result is returned 221 to the call processing server 224 from the identification server 222. The initiated call 215 may then be routed to the correct conference call bridge or recipient device for a call session.

Subsequent to the call, the user account information may be applied to the call 223 and an invoice may be generated to update the billing record 227 to include the call duration, the call origination location, the call termination location, the type of call, etc. The applicable tax rates 225 may be applied to generate an invoice and corresponding bill 227 which may be forwarded to the proper agency or banking institution for review. When the call is completed the call data is saved on a specific record or conference detail record (CDR), to include, name, date, time used, number dialed, origination number, etc. All parties may receive an invoice at the end of the month based on the calls made.

Figure 3A:
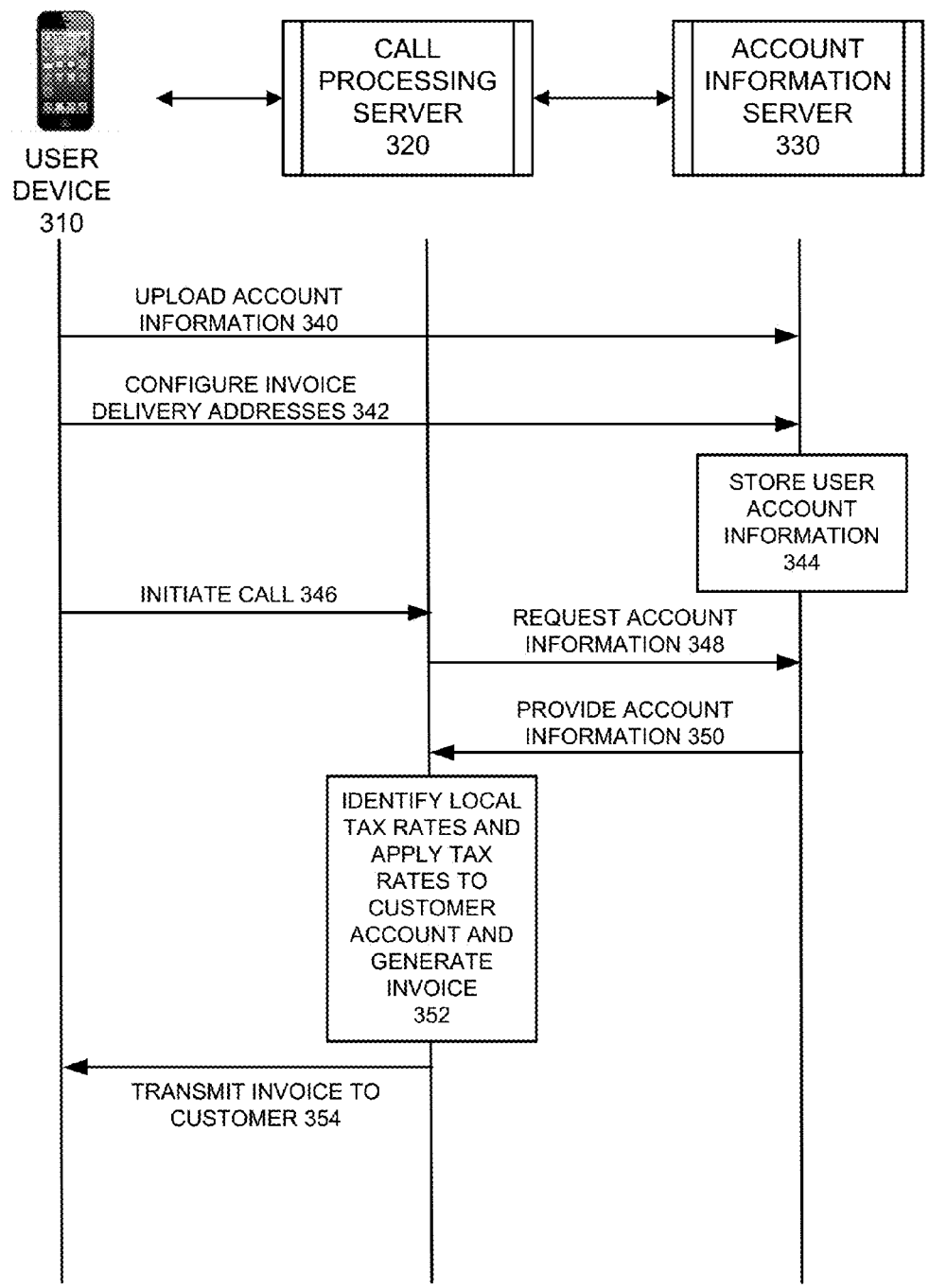
FIG. 3A illustrates an example communication flow diagram according to example embodiments of the present application.

FIG. 3A illustrates an example communication flow diagram according to example embodiments of the present application. Referring to FIG. 3A, the signaling diagram 300 includes the user device, the call processing server 320 and the account information server 330, each of which are part of the call initiation, processing and subsequent invoice generation procedures. In operation, the user device 310 will upload its user account information 340 or at least trigger such an operation to be performed by a database that stores a user profile and which retrieves that information when the user device 310 initiates a call. The user device may also configure an invoice delivery address 342 when the call is initiated as a preliminary operation to the call being processed. As the call information, such as the user name, address, hardware address, ANI information, phone SIM card information, login credentials, location, IP address, call recipient address, etc., is identified the information may be received and stored 344 in the account information server 330 for subsequent invoice processing operations.

After the preliminary information is exchanged, a call may be initiated 346 by the user device 310 to an intended recipient. The call processing server may then request the account information 348 prior to routing the call. The information may be received 350 from an account information server 330 and the call can then be bridged to the conference call or call recipient. The local tax information may be cross-referenced to the user device location, such as its present carrier service provider, GPS location, home address, business address, etc. The local taxes, state, government, countrywide, and other applicable taxes can then be determined and applied to the call duration and type of call 352. The invoice is then generated and a corresponding link can be shared to the user's email 354 so the invoice can be reviewed and approved.

FIG. 3B illustrates an example screenshot of a call summary and tax rate user interface 350 according to example embodiments of the present application. Referring to FIG. 3B, the example GUI display 350 includes various information parameters which are updated when a call is placed or calls are performed. For instance, the various taxes included in the tax column 370 may be listed and aggregated to provide a total tax required for the call and a grand total 384. The amount of dollars required may also be displayed in an adjacent column 360. Each of the taxes are identified by name 372-380 and a total 382 is used to illustrate the sum of taxes to be applied.

Figure 4A:
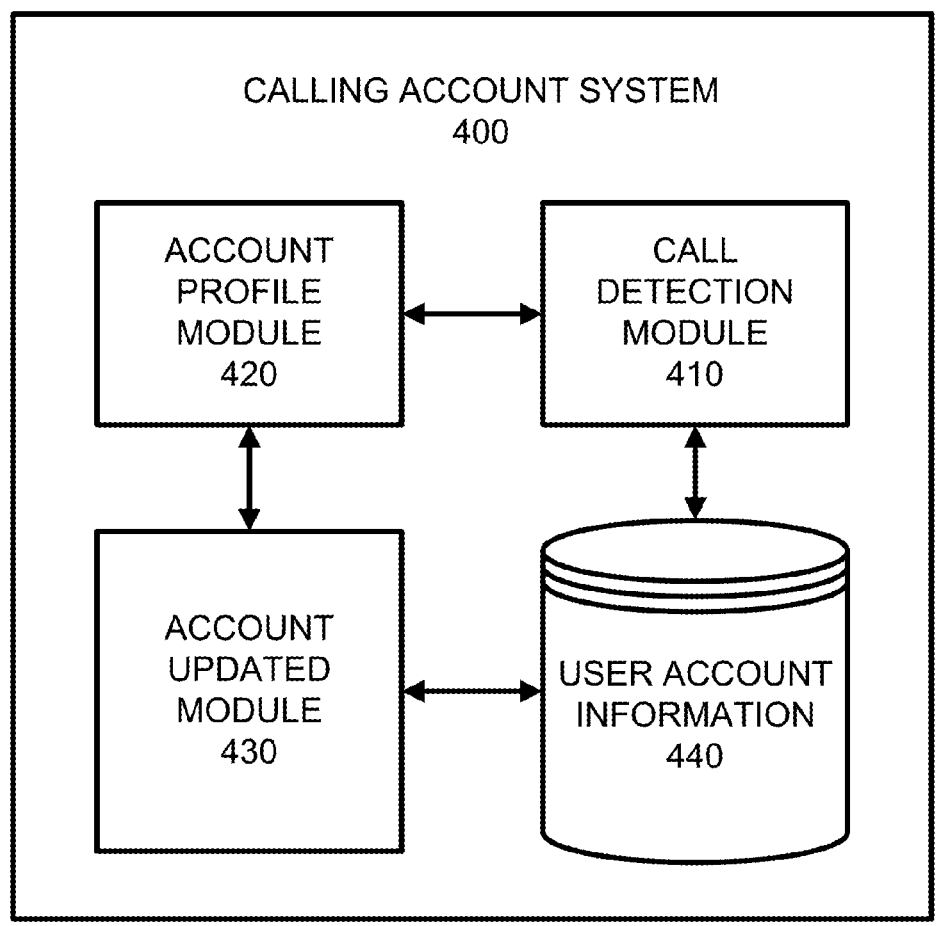
FIG. 4A illustrates a system configuration that is configured to perform one or more operations corresponding to the example embodiments.

FIG. 4A illustrates a calling account system 400 which may be a single entity or multiple devices used to perform the various operations required to generate an invoice (preliminary invoice) based on a call processing application. The call detection module 410 may detect a call being placed and report the call as a trigger to initiate a call session, an invoice creation procedure, a tabulation of call related parameters and a profile retrieval operation that identifies the caller, his or her calling credentials and any other information required to generate the invoice. An account profile module 420 may identify the user profile and apply that information to the current invoice creation procedure. Once the call has taken place and the account has been updated accordingly, the invoice may be generated to include the call details of the call itself and the users who were part of the call to determine a cost estimate and all applicable taxes involved. The updated user account information may be stored in the database 440 and referenced when needed.

Additionally, the system 400 may estimate a cost of the call session, apply a number of tax rates to the preliminary invoice, and calculate a total tax cost based on the cost of the call session which may be between 2 or more parties. The call session may be a conference call that includes a number of call recipients. The system account update module 430 may then update a number of tax rates based on changes to the tax rates that have occurred since a previous invoice generation operation and prior to updating the preliminary invoice to include details of the call session. A final invoice may then be generated for all calls for a predetermined period of time, which is then shared with a number of different recipients. As a result, a web link may be generated to the final invoice, and transmitted to at least one of the recipients. The final invoice includes a summary of all charges, a bank deposit form, and call information for all calls during the predetermined period of time.

Figure 4B:
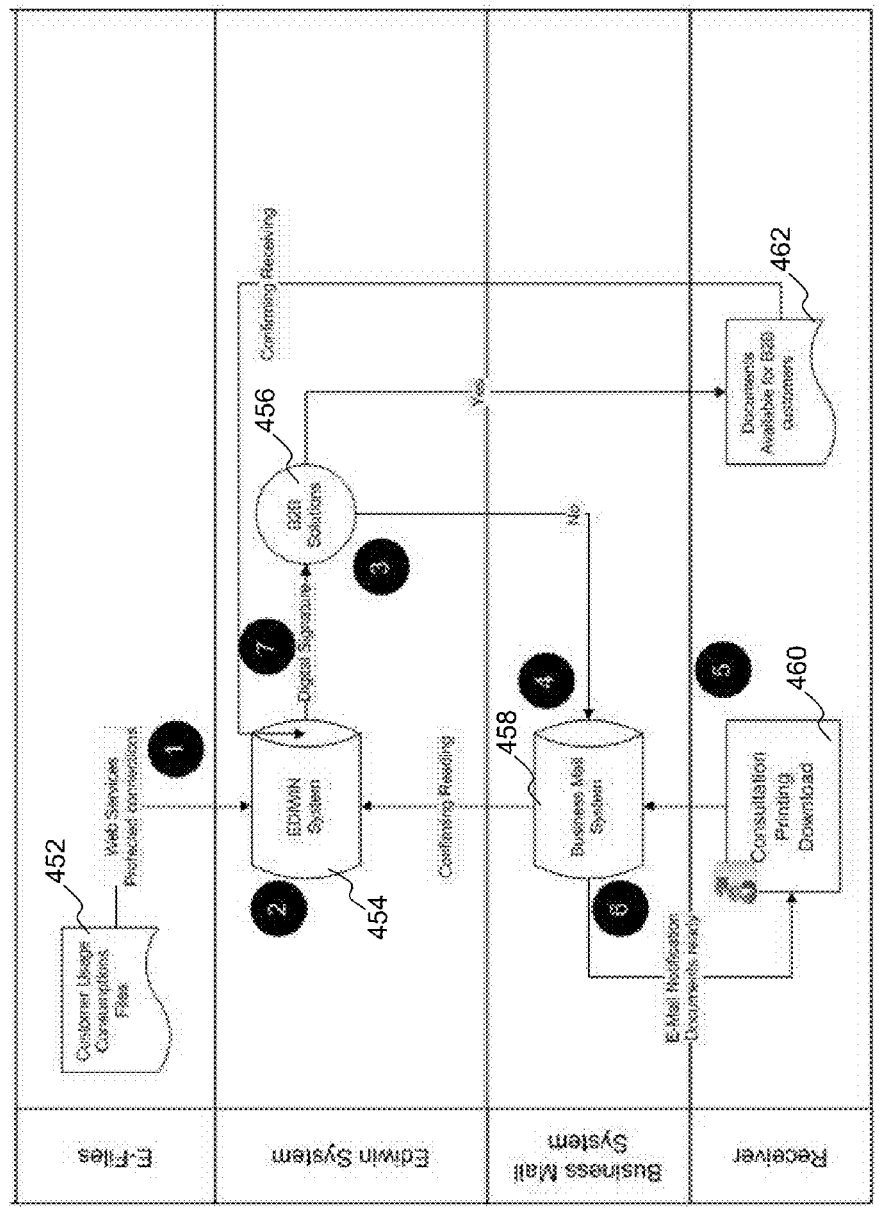
FIG. 4B illustrates an example logic diagram of the data collection and invoice generation procedure according to example embodiments.

FIG. 4B illustrates an example logic diagram of the data collection and invoice generation procedure according to example embodiments. Referring to FIG. 4B, during the data transfer operations the web services may provide a set of customer usage consumption files to the data processing system for invoice generation, updates and corresponding processing operations. The data that is received is transformed and the corresponding invoices that are created are signed with a delegated signature service. The authenticity may then be verified. If the customer has the proper invoice viewing application the invoice may be sent directly to the customer otherwise the data is sent to a business mail system. The business mail system may then notify the customer via an email to view the invoice. A digital signature is processed by the tax authority to check the tax authorities of the various different states or municipalities.

Referring to FIG. 4B, the logic diagram 450 provides a data flow and corresponding business process used to accept the needed data and create an invoice based on the various dynamic fields and parameters. In the e-files generation segment, the customer usage and consumption files 452 may be already generated as a document(s) that is then transferred by the web services at operation '1'. The "Ediwin" system segment represents a mapping function operated on a server 454 that substantiates the digital signature and submits the verification to the B2B solution platform 456. The mapping and electronic signature receives the data and transforms the data into an invoice. The data is signed and the authenticity is then verified. Item '2' provides the mapping procedure and item '3' provides a sending operation that sends the invoice to a customer directly or to a business mail system configured to identify the information. Item '7' provides for processing the invoices and using the validation services with the tax authorities of the various different states or municipalities of a particular country where the service is being used. In item '4' all the documents are then published and the business mail system 458 may distribute the documents via email accordingly. Item '6' illustrates the receiver portal receiving the documents accordingly. Also, the consultation printing download operation 460 may be a viewing platform that receives notification or emails at item '5'. The corresponding documents may be available for B2B customers as well 462.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 5 illustrates an example network element 500, which may represent any of the above-described network components of the other figures, etc.

Figure 5:
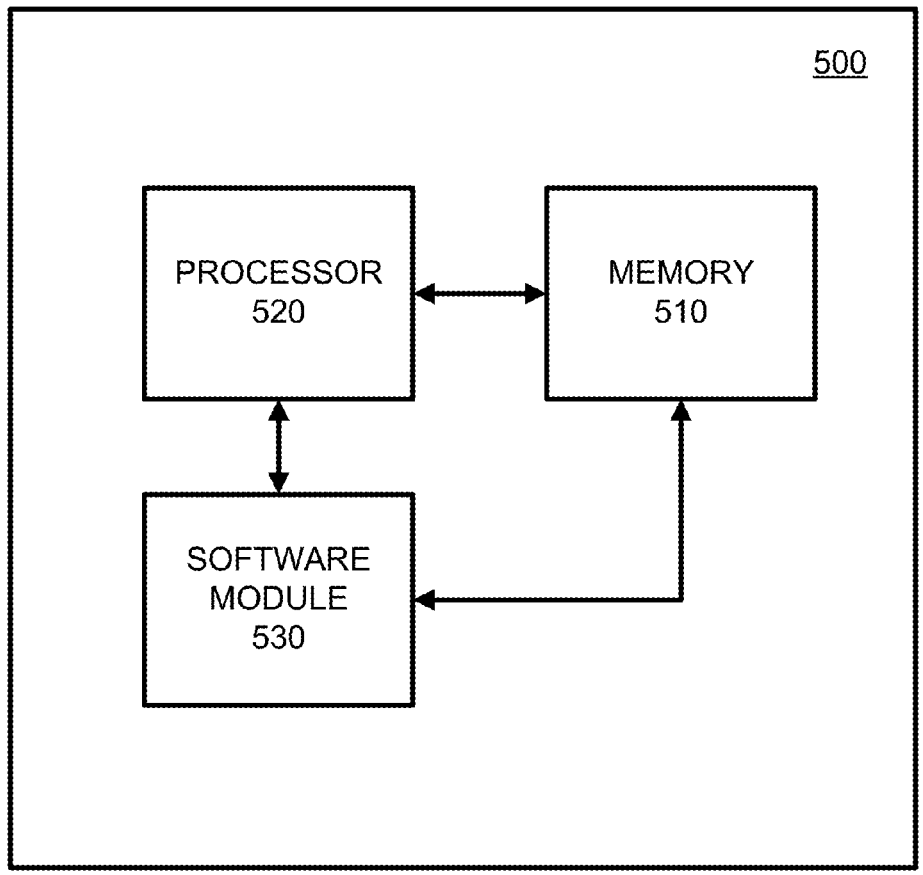
FIG. 5 illustrates an example network entity device configured to store instructions, software, and corresponding hardware for executing the same, according to example embodiments of the present application.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 4 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
identifying a call session being initiated by at least one call party device;
retrieving account information of the at least one call party;
generating a preliminary invoice based on the initiated call session including the account information, the preliminary invoice comprising a call duration, a call origination location, a call termination location and a call type;
updating the preliminary invoice to include details of the call session once the call session has ended and creating an updated invoice comprising at least one applicable tax rate;
identifying a location of the at least one call party device and applying the at least one applicable tax rate based on local tax information associated with the location of the at least one call party, the call duration and the call type;
updating a plurality of tax rates based on changes to the plurality of tax rates that have occurred since a previous invoice generation operation prior to updating the preliminary invoice to include details of the call session; and
generating a final invoice for all calls for a predetermined period of time, the final invoice comprising the updated plurality of tax rates.

2. The method of claim 1, further comprising:
estimating a cost of the call session;
applying a plurality of tax rates to the preliminary invoice; and
calculating a total tax cost based on the cost of the call session.

3. The method of claim 1, wherein the call session is between two parties.

4. The method of claim 1, wherein the call session is a conference call comprising a plurality of call recipients.

5. The method of claim 1, further comprising:
sharing the final invoice with a plurality of recipients;
generating a web link to the final invoice; and
transmitting the invoice to at least one of the plurality of recipients.

6. The method of claim 5, wherein the final invoice comprises a summary of all charges, a bank deposit form, and call information for all calls during the predetermined period of time.

7. An apparatus comprising:
a receiver configured to receive a call session message indicating a call session being initiated; and
a processor configured to
identify the call session being initiated by at least one call party device,
retrieve account information of the at least one call party,
generate a preliminary invoice based on the initiated call session including the account information, the preliminary invoice comprising a call duration, a call origination location, a call termination location and a call type, and update the preliminary invoice to include details of the call session once the call session has ended and creating an updated invoice comprising at least one applicable tax rate, identify a location of the at least one call party device and applying the at least one applicable tax rate based on local tax information associated with the location of the at least one call party, the call duration and the call type, update a plurality of tax rates based on changes to the plurality of tax rates that have occurred since a previous invoice generation operation prior to updating the preliminary invoice to include details of the call session, and generate a final invoice for all calls for a predetermined period of time, the final invoice comprising the updated plurality of tax rates.

8. The apparatus of claim 7, wherein the processor is further configured to estimate a cost of the call session;

apply a plurality of tax rates to the preliminary invoice; and calculate a total tax cost based on the cost of the call session.

9. The apparatus of claim 7, wherein the call session is between two parties.

10. The apparatus of claim 7, wherein the call session is a conference call comprising a plurality of call recipients.

11. The apparatus of claim 7, wherein the processor is further configured to share the final invoice with a plurality of recipients, generate a web link to the final invoice, and wherein the apparatus further comprises:

a transmitter configured to transmit the final invoice to at least one of the plurality of recipients.

12. The apparatus of claim 11, wherein the final invoice comprises a summary of all charges, a bank deposit form, and call information for all calls during the predetermined period of time.

13. A non-transitory computer readable storage medium configured to store instructions that when executed cause a processor to perform:

identifying a call session being initiated by at least one call party device;

retrieving account information of the at least one call party;

generating a preliminary invoice based on the initiated call session including the account information, the preliminary invoice comprising a call duration, a call origination location, a call termination location and a call type;

updating the preliminary invoice to include details of the call session once the call session has ended and creating an updated invoice comprising at least one applicable tax rate;

identifying a location of the at least one call party device and applying the at least one applicable tax rate based on local tax information associated with the location of the at least one call party, the call duration and the call type;

updating a plurality of tax rates based on changes to the plurality of tax rates that have occurred since a previous invoice generation operation prior to updating the preliminary invoice to include details of the call session; and generating a final invoice for all calls for a predetermined period of time, the final invoice comprising the updated plurality of tax rates.

14. The non-transitory computer readable storage medium of claim 13, wherein the processor is further configured to perform:

estimating a cost of the call session;

applying a plurality of tax rates to the preliminary invoice; and calculating a total tax cost based on the cost of the call session.

15. The non-transitory computer readable storage medium of claim 13, wherein the call session is between two parties.

16. The non-transitory computer readable storage medium of claim 1, wherein the call session is a conference call comprising a plurality of call recipients.

17. The non-transitory computer readable storage medium of claim 13, wherein the processor is further configured to perform:

sharing the final invoice with a plurality of recipients;

generating a web link to the final invoice; and transmitting the final invoice to at least one of the plurality of recipients, and wherein the final invoice comprises a summary of all charges, a bank deposit form, and call information for all calls during the predetermine period of time.

* * * * *